United States Patent [19]

Kaneko et al.

[11] Patent Number: 4,547,787
[45] Date of Patent: Oct. 15, 1985

[54] IMAGE FORMING APPARATUS WITH DISPLAYING AND PRINTING FUNCTIONS

[75] Inventors: Shuzo Kaneko, Tokyo; Yasuyuki Tamura, Kawasaki, both of Japan

[73] Assignee: Canon Kabushiki Kaisha, Tokyo, Japan

[21] Appl. No.: 459,132

[22] Filed: Jan. 19, 1983

[30] Foreign Application Priority Data

Jan. 25, 1982 [JP] Japan ................................ 57-9870

[51] Int. Cl.$^4$ ........................ G01D 15/14; G01D 15/06
[52] U.S. Cl. ................................ 346/160; 346/153.1; 340/783; 340/792
[58] Field of Search ............... 346/160, 153.1, 74.2, 346/138, 107, 108, 150; 355/5; 340/702, 783, 792, 815.26, 825.26; 358/301

[56] References Cited

U.S. PATENT DOCUMENTS 3,641,585 2/1972 Hodges ........................... 346/74.2
3,914,771 10/1975 Lunde et al. .................... 346/74.2

FOREIGN PATENT DOCUMENTS 634008 1/1962 Canada ........................... 346/160

Primary Examiner—E. A. Goldberg
Assistant Examiner—Fred L. Kampe
Attorney, Agent, or Firm—Fitzpatrick, Cella, Harper & Scinto

[57] ABSTRACT

An image forming apparatus has both of the function of displaying a toner image recorded on an image bearing member and the function of transferring the recorded toner image to a transfer material and obtaining it as a print. Particularly, the apparatus makes reversal of the direction of movement of the image bearing member possible by developing the photosensitive member simultaneously with the application of light information in a process which does not require a charging step, and forms a toner image in the form of a positive image or a mirror image on the image bearing member. The positive image is used for display, and the mirror image is used for printing.

10 Claims, 16 Drawing Figures

FIG. 13

IMAGE FORMING APPARATUS WITH DISPLAYING AND PRINTING FUNCTIONS

BACKGROUND OF THE INVENTION

1. Field of the Invention

This invention relates to an image forming apparatus which is capable of displaying image information such as characters and figures and obtaining such image information as a print. More particularly, it relates to an image forming apparatus in which image information is formed by toner on a repetitively usable image bearing member and such image information is used for display or printing.

2. Description of the Prior Art

Figure 1:
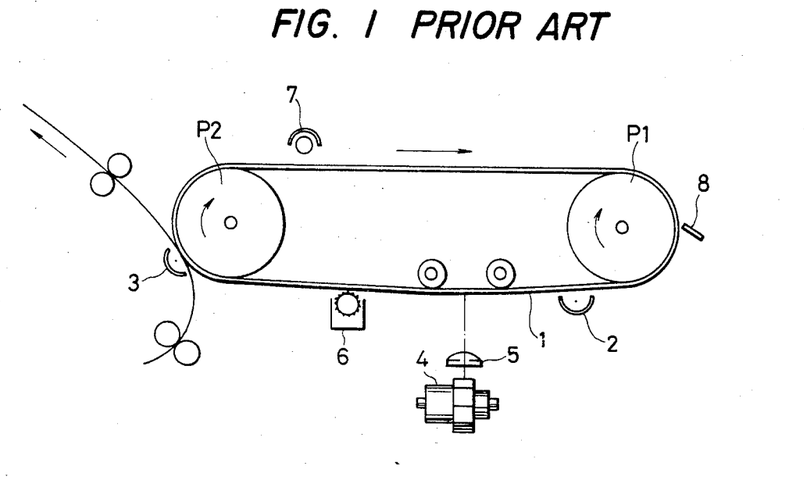
FIG. 1 is a cross-sectional view showing the essential portions of a printing apparatus according to the prior art.

To visualize signals used in communications or the like, there has heretofore been a printing apparatus of the electrophotographic type using a light beam modulated by such signals. This apparatus exposes the modulated light beam in the form of dots on the surface of a photosensitive member, instead of the image exposure by an original in a copying apparatus which is usually often used, and the epitome of such apparatus is shown in FIG. 1 of the acompanying drawings. Reference numeral 1 designates a photosensitive member having a photoconductive layer provided on a conductive substrate. The photosensitive member 1 is passed over pulleys P1 and P2 driven in the direction of arrows by a drive source, not shown. Reference numeral 2 denotes a charger, reference numeral 3 designates a transfer charger, reference numeral 4 denotes a scanner for scanning and exposing a modulated light beam on the photosensitive member 1, reference numeral 5 designates a lens, reference numeral 6 denotes a developing device, reference numeral 7 designates a discharging lamp for removing any residual charges, and reference numeral 8 denotes a cleaner for collecting any residual toner. The light beam reflected by the scanner 4 scans the surface of the photosensitive member, whereby an electrostatic latent image corresponsing to the signal information is formed on the photosensitive member 1.

Figure 2:
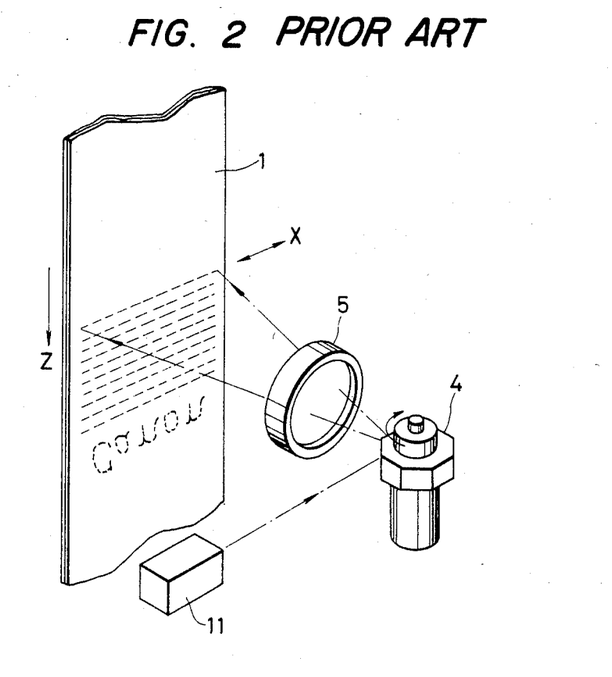
FIG. 2 is a perspective view of an optical system showing the scanning of a light beam relative to a photosensitive member.

The manner of scanning is shown in FIG. 2 of the accompanying drawings. In FIG. 2, reference numeral 11 designates a laser beam generator which generates a light beam modulated by signals. The light beam scans the surface of the photosensitive member 1 in a direction X substantially perpendicular to the direction of movement Z of the photosensitive member. In this case, the latent image formed on the surface of the photosensitive member is a mirror image of the image to be formed by transfer.

Figure 3:
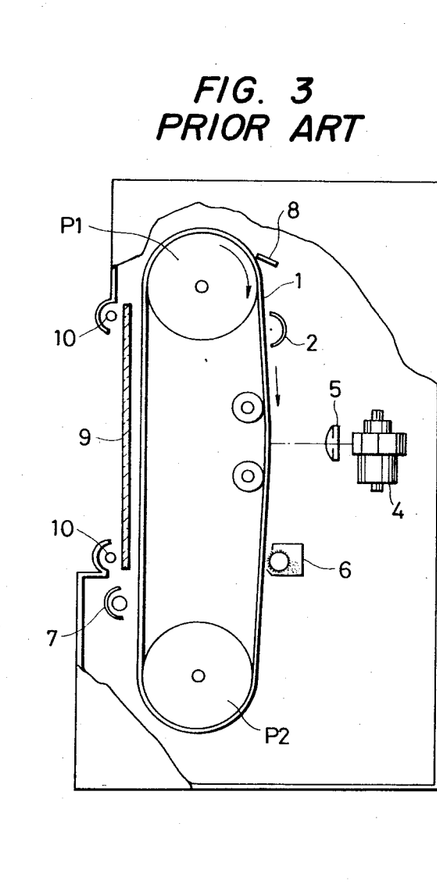
FIG. 3 is a cross-sectional view showing the essential portions of a display apparatus according to the prior art.

The above-described printing apparatus obtains the signal information as a hard copy only when the toner image in the form of a mirror image is transferred to a transfer material such as paper. However, for example, when the above-mentioned information need not be made into a hard copy, or when it is desired to know the substance of the signal information before it is made into a hard copy, it would occur to mind to use the apparatus as a display apparatus as shown in FIG. 3 of the accompanying drawings without making the apparatus into a printing apparatus. In FIG. 3, reference numeral 9 designates a transparent protecting portion such as transparent glass disposed in the display portion, and reference numeral 10 denotes an illuminating lamp for illuminating the photosensitive member 1 disposed in the display portion.

In this display apparatus, the image formed on the photosensitive member must be a positive image. Thus, if the light beam is scanned from right to left relative to the direction of movement of the photosensitive member as in the case of the printing apparatus of FIG. 2 and a latent image in the form of a mirror image is formed on the surface of the photosensitive member, in this display apparatus, the signal itself input to the light beam generator in said printing apparatus must be changed to form a latent image in the form of a positive image or the direction of rotation of the scanner 4 must be reversed and the light beam must be scanned from left to right toward the direction of movement of the photosensitive member, thereby forming a latent image in the form of a positive image.

Figure 4:
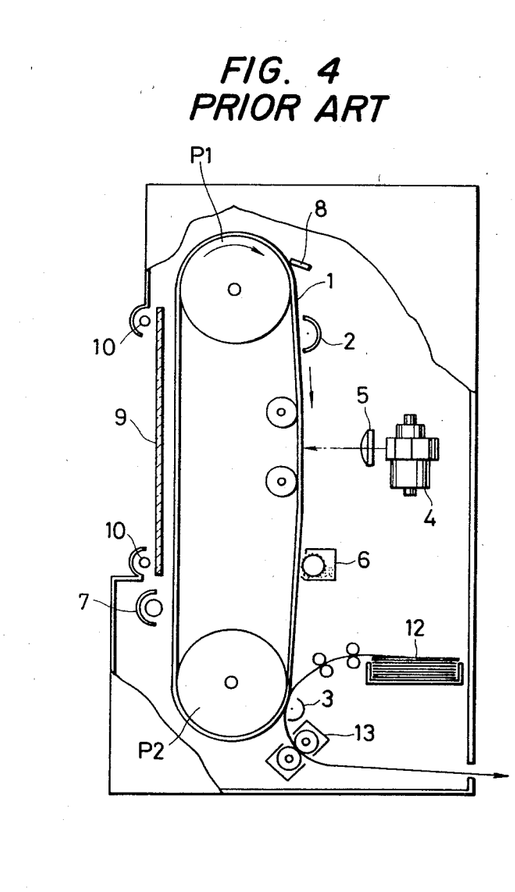
FIG. 4 is a cross-sectional view showing the essential portions of a display and printing apparatus according to the prior art.

An apparatus having the two functions of the above-described printing apparatus (FIG. 1) and the above-described display apparatus (FIG. 3) will now be considered. FIG. 4 of the accompanying drawings is a cross-sectional view showing an example of such apparatus. In FIG. 4, reference numeral 13 designates a fixing device for fixing the unfixed image on a transfer matereial, and reference numeral 12 designates a transfer material such as paper. Where this apparatus is used as a printing apparatus, transfer means such as transfer charger 3, the fixing device 13, etc. are operated and the scanner 4 scans the light beam in the direction of arrow indicated in FIG. 2. Where this apparatus is used as a display apparatus, the toner image on the photosensitive member 1 is not transferred to the transfer material and therefore, the various means for transfer are not operated and it is necessary to rotate the scanner 4 in a direction opposite to the direction of the arrows in FIG. 2 or to change the input signal itself of the light beam generator and make the latent image into a positive image.

Thus, in the method of making the latent image formed in the form of a mirror image into a positive image, as described above, it will be possible (1) to change the signal itself or (2) to reverse the direction of rotation of the scanner and in addition, (3) to change the direction of movement of the photosensitive member without changing the direction of rotation of the scanner.

However, in an image forming apparatus adopting the conventional latent image forming process, it is necessary that the developing device lie downstream of the latent image forming position as viewed in the direction of movement of the photosensitive member. Consequently, if the method of solution mentioned under item (3) above is adopted, latent image forming means and developing means must be disposed around the peripheral surface of the photosensitive member corresponding to the direction of movement of the photosensitive member. At the same time, the latent image forming means and the developing means must be selectively operated depending on the direction of movement of the photosensitive member, and this leads not only to a complicated construction but also to cumbersome control of operation and higher probability of malfunctioning or failure.

SUMMARY OF THE INVENTION

It is an object of the present invention to provide an image forming apparatus having both displaying and printing functions which is simple in construction.

It is another object of the present invention to provide an image forming apparatus which can effect display or printing with a minimum movement distance of the image bearing member.

It is still another object of the present invention to provide an image forming apparatus which effects display and printing of high quality.

The present invention which achieves these objects has an image bearing member movable forward and backward, means for forming an erasable toner image corresponding to a recording signal in a direction substantially perpendicular to the direction of movement of the image bearing member, a display portion for visually recognizing a toner image formed on the image bearing member when the image bearing member is moved in a first direction, and means for transferring the toner image on the image bearing member to a transfer material when the image bearing member is moved in a second direction opposite to the first direction.

DESCRIPTION OF THE PREFERRED EMBODIMENTS

Figure 5A:
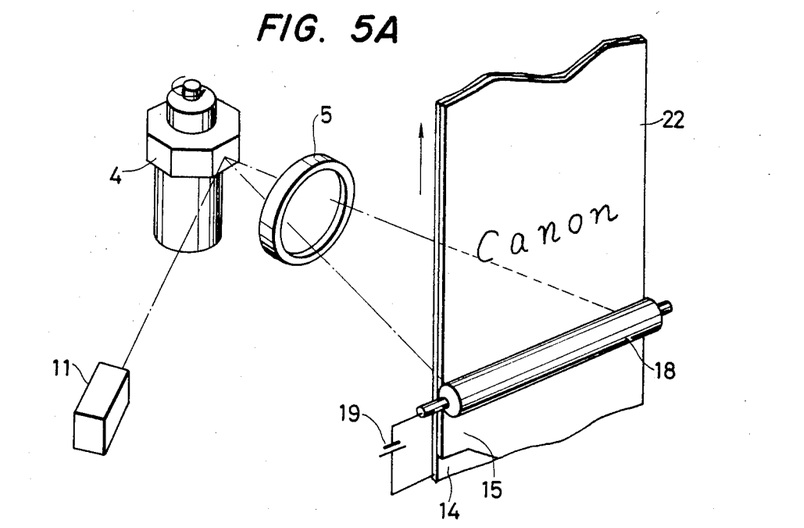
FIGS. 5A and 5B illustrate the states of the image when the direction of movement of a photosensitive member has been changed.
Figure 5B:
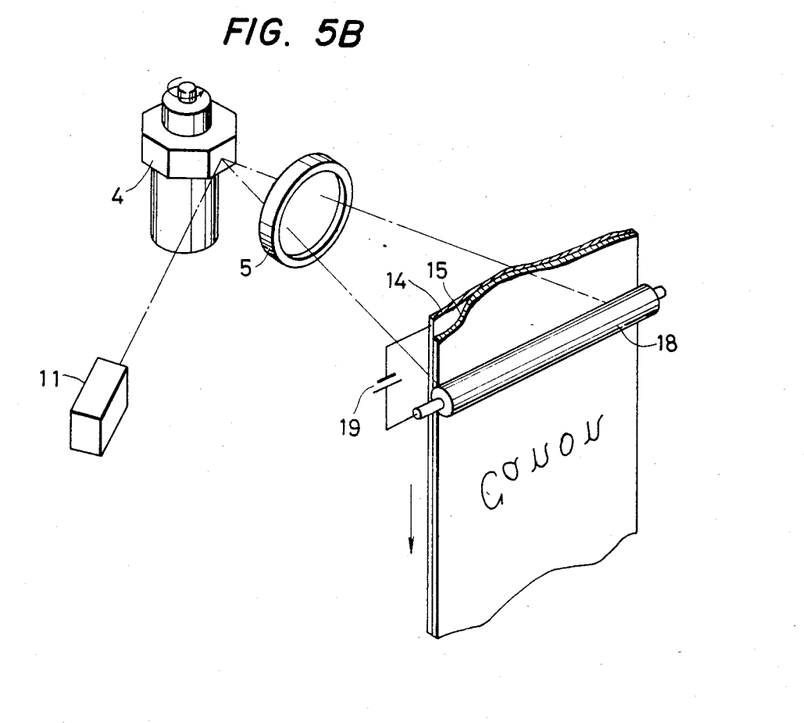

Embodiments of the present invention will hereinafter be described with reference to the drawings. FIGS. 5A and 5B show the image forming portion of the displaying and printing apparatus of the present invention. FIG. 5A illustrates a case where a positive image is formed, and FIG. 5B illustrates a case where a mirror image is formed.

Figure 6A:
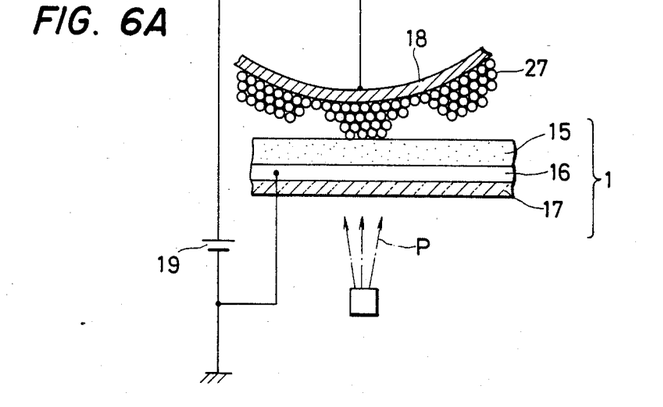
FIGS. 6A to 6C illustrate the toner image forming process applicable to the present invention.

The principle of the visible image forming process shown in FIGS. 5A and 5B will be described in detail with reference to FIGS. 6A, 6B and 6C. This process, unlike the image forming process described with reference to FIG. 1, does not require the charging step, but simultaneously with exposure, it forms a toner image on an image bearing member correspondingly to the light information by the exposure. In this process, a photosensitive member 1 comprising a transparent substrate 17, a transparent conductive substrate 16 thereon and an N type photosensitive layer 15 on the surface thereof is used as the image bearing member. Conductive toner 27 is used as a visualizing agent, and as shown in FIG. 6A, DC bias is applied between the conductive toner 27 and the transparent conductive substrate 16 of the photosensitive member by a DC power source 19 such that the conductive toner side is positive, and in this condition, an image light P is applied to the photosensitive member 15 from the transparent conductive substrate 17 side.

Figure 6B:
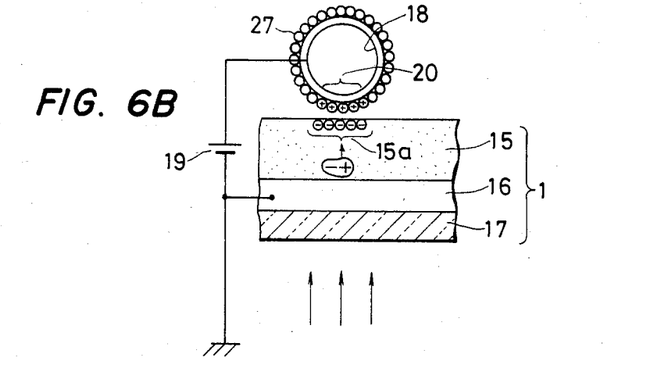
Figure 6C:
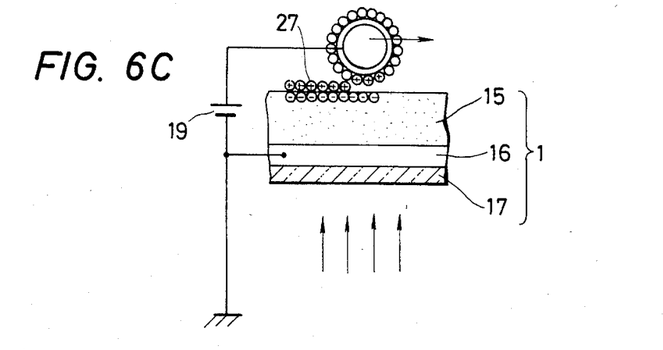

In this case, as shown in FIG. 6B, in the light portion to which light has been applied, photocarriers 15a created and moving in the N type photosensitive member induce positive charges 20 in the conductive toner 27 directed to the surface of the photosensitive member. As a result, coulomb force is created between the carriers 15a and the toner 27 and as shown in FIG. 6C, the toner 27 adheres to the surface of the photosensitive member. In FIG. 6, reference numeral 18 designates a toner supply carrying member which serves also as an electrode for imparting charges to the conductive toner. The photosensitive layer is not restricted to the N type photosensitive layer 15, but other photosensitive layers may also be used. Where a P type photosensitive layer is used, DC bias is applied such that the conductive toner side is negative, and where a photosensitive layer of both polarities or a P type N type compound photosensitive layer is used, similar image formation is effected by suitably selecting the polarity of the DC bias applied to the toner carrying member 18. The toner developed and caused to adhere by this method does not affect the next image formation and therefore, no cleaner need be provided in the apparatus.

As described above, the image forming process shown in FIG. 6 does not require charging and in this process, development is effected at the same position as the image exposure and thus, this process is very simple as compared with the previously described image forming method having the processes of charging, exposure and development.

In the apparatus of FIG. 5 to which the above-described process is applied, DC bias is applied between the transparent conductive substrate 14 of the photosensitive member 22 having the photosensitive layer 15 provided on the transparent conductive substrate (representing as a unit the transparent substrate 17 and the transparent conductive substrate 16 in FIG. 6) 14 and the toner carrying member 18 of the developing device. Here is shown the applied polarity of the DC power source 19 in a case where an N type photosensitive layer is used as the photosensitive layer 15. A light beam is applied from the transparent conductive substrate 14 side to the photosensitive layer 15. Development is effected by the light beam being applied at a position whereat the conductive toner has been directed onto the surface of the photosensitive member and therefore, if it is assumed that the photosensitive member is developed and a positive image is formed simultaneously with the application of the light beam (FIG. 5A) by the photosensitive member being moved from right to left relative to the scanning direction of the light beam, a mirror image is immediately formed (FIG. 5B) by the photosensitive member being moved from left to right relative to said scanning direction. Accordingly, display means is provided on that side on which the photosensitive member is moved from right to left relative to the scanning direction of the light beam, and transfer means is provided on that side on which the photosensitive member is moved from left to right.

Figure 7:
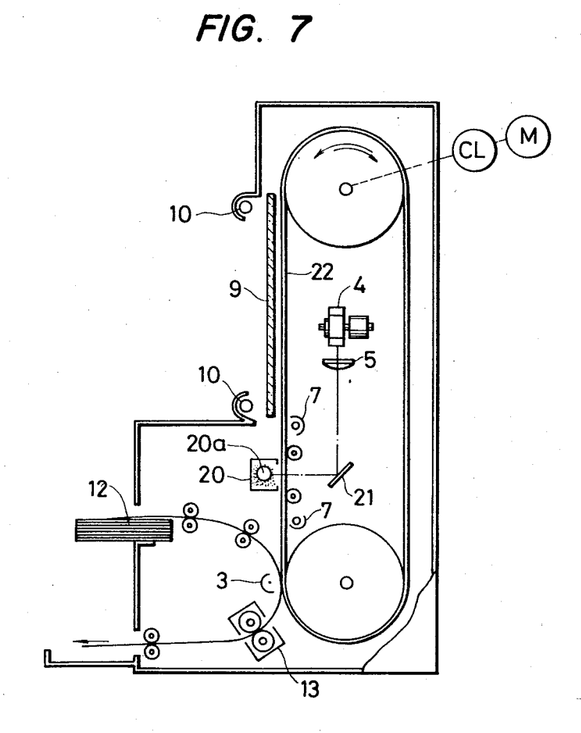
FIGS. 7 and 8 are cross-sectional views showing the essential portions of a display and printing apparatus according to an embodiment of the present invention.

FIG. 7 schematically shows the image forming apparatus of the present invention having displaying and printing functions. As in FIG. 5, DC bias is applied between a toner carrying member 20a in a developing device 20 and the transparent conductive substrate of a belt-like photosensitive member 22. As a specific means for causing such a toner carrying member to hold conductive toner, the toner may be endowed with magnetism and use may be made of a conventional magnet roller therewith. The light beam modulated and reflected by a scanner 4 passes through a lens 5 and a reflecting mirror 21 and is applied to the developing position of the photosensitive member 22. In this case, if the photosensitive member 22 is moved clockwise, a toner image in the form of a positive image is formed on the surface thereof and fed to a display station. If the photosensitive member 22 is moved counter-clockwise, a toner image in the form of a mirror image is formed on the surface of the photosensitive member and this toner image is fed to a transfer station and transferred to a transfer material 12 conveyed in synchronism with the photosensitive member 22. A discharging lamp 7 is turned on as required so that no light history may be left on the photosensitive member after image formation thereon has been effected, and this lamp need not always be provided.

Figure 8:
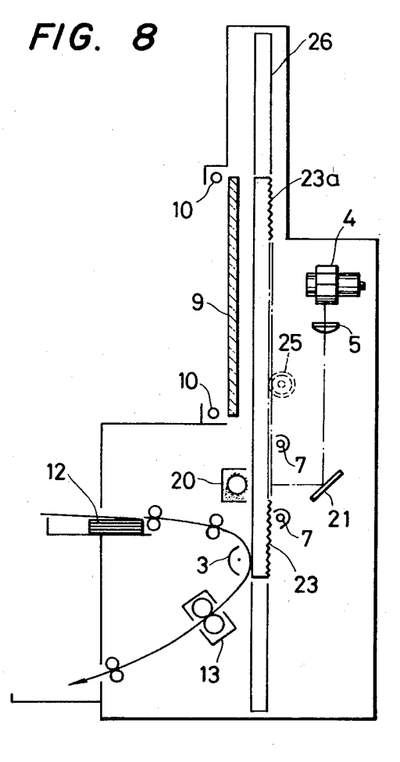
Figure 9:
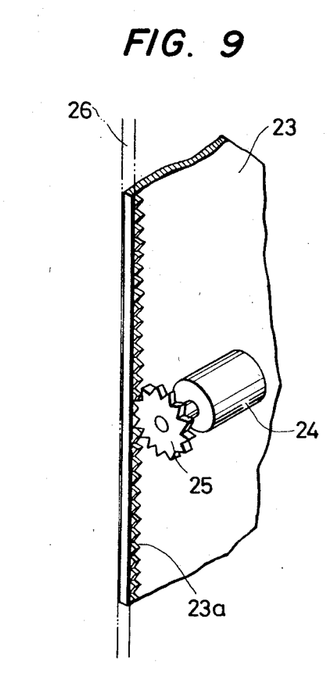
FIG. 9 is a perspective view of a driving portion for the photosensitive member of FIG. 8.

In the apparatus shown in FIG. 7, the belt-like photosensitive member 22 may be continuously moved around, whereby the image thereon may be continuously developed and transferred to roll paper or the like, but where continuous development and transfer is not necessary, an apparatus using a planar photosensitive member as shown in FIG. 8 would occur to mind. In the apparatus of FIG. 7, when the direction of movement of the photosensitive member 22 is to be changed, a clutch CL may be operated by a signal produced upon selection of display and printing or a voltage applied to a reversible motor M may be changed, thereby changing the direction of movement of the photosensitive member 22. In the apparatus of FIG. 8, a planar photosensitive member 23 having a photosensitive layer provided on a transparent conductive substrate is moved up and down in a plane, and the drive means therefor is of such a construction that, as shown in FIG. 9, a rack gear 23a is a provided on either side edge of the transparent conductive substrate of the planar photosensitive member 23 and a pinion gear 25 in mesh engagement with the rack gear is driven by a reversible motor 24. Designated by 26 is a guide rail formed in the apparatus body for guiding and supporting the moving planar photosensitive member.

On the other hand, the above-described process which does not adopt the charging step but obtains a visible image by effecting development simultaneously with exposure is advantageous in that it does not require such equipments as control means for charging and a high voltage generator. However, if the bias voltage is varied in the direction for enhancing the image density, there may be created fog in some cases.

Figure 10:
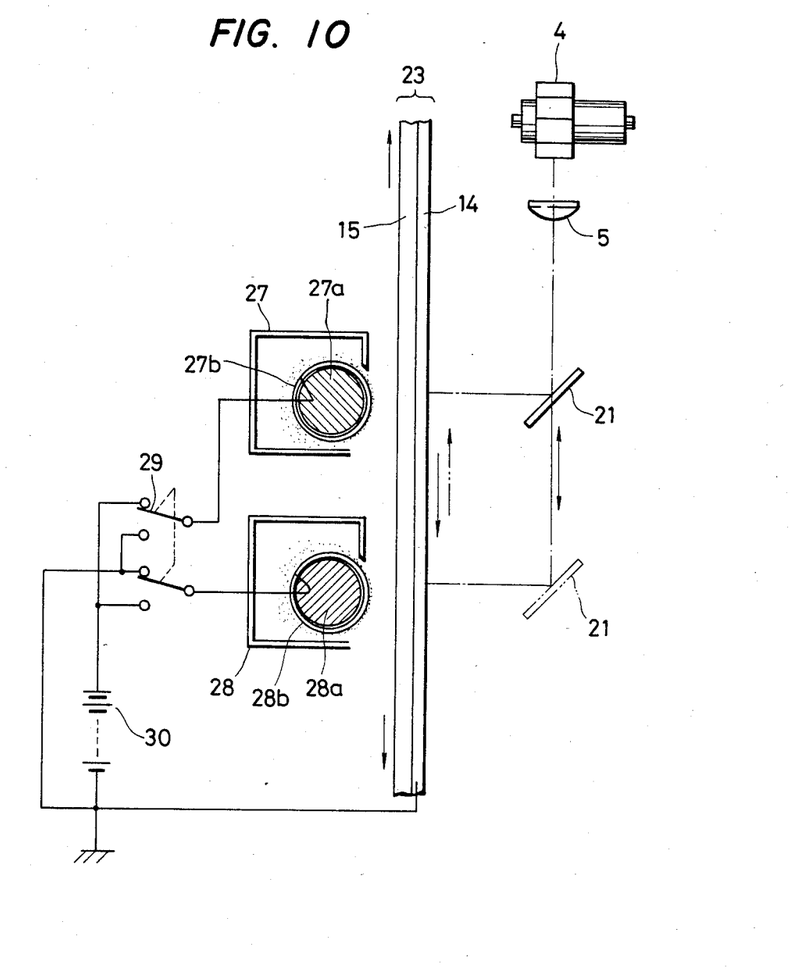
FIG. 10 is a partially cross-sectional view showing an embodiment of the construction for preventing fog when the process of FIG. 6 is adopted.

FIG. 10 shows an example of the construction which prevents creation of such fog. Two developing devices 27 and 28 of the same construction are disposed along a planar photosensitive member 23 (alternatively, a circular or endless photosensitive member) having a photosensitive layer 15 provided on a transparent conductive substrate 14. Each of these developing devices is provided with a toner carrying member 27b, 28b having magnet 27a, 28a therein, and uses a conductive magnetic developer as the developer.

When printing is to be effected, the planar photosensitive member 23 is moved in the direction of solid-line arrow and DC bias is applied from a DC power source 30 to the toner carrying member 27b of the developing device 27 by means of a change-over switch 29. Simultaneously therewith, a light beam signal-modulated through a scanner 4, a lens 5 and a stationary reflecting mirror 21 is applied to the transparent conductive substrate 14 of the planar photosensitive member opposed to the developing device 27. On the other hand, the toner carrying member 28b of the other developing device 28 is grounded through the change-over switch 29, and the surface of the planar photosensitive member developed at the same time corresponding to the application of said light beam is again brought into contact with the toner.

Figure 11:
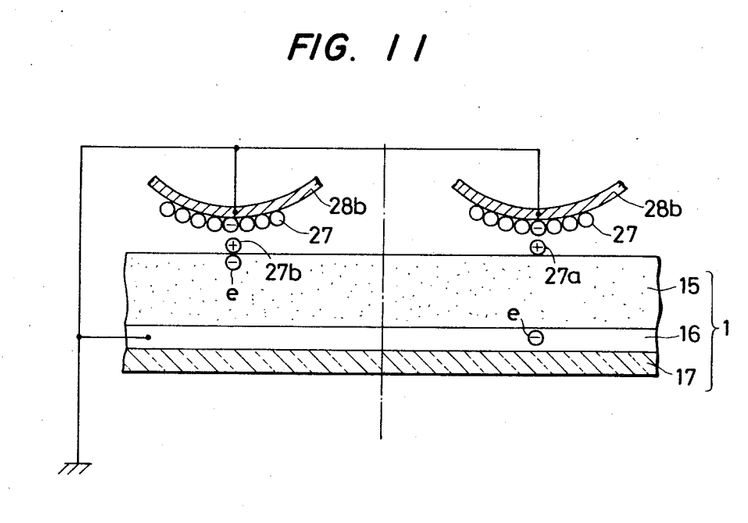
FIG. 11 illustrates the principle on which fog can be eliminated by the construction of FIG. 10.

The reason why fog can be eliminated by the above-described construction will hereinafter be described by reference to FIG. 11. FIG. 11 is an enlarged, diagrammatic view of the photosensitive member after being developed. Reference numeral 28b designates the grounded toner carrying members. The right-hand toner 27a in FIG. 11 is the toner forming the fog, and the left-hand toner 27b is the toner on the image side having adhered to the surface of the photosensitive member due to electrostatic force upon exposure to light. As is apparent from FIG. 11, the toner 27a forming the fog is carried away to the carrying member 28b side by the electrostatic force and magnetic force produced by charges of the opposite polarity induced in the toner on the carrying member 28b side. On the other hand, the toner 27b on the image side and the carrier on the photosensitive member side attract each other strongly and therefore, the toner 27b is not carried away even if charges of the opposite polarity are induced in the toner on the carrying member side.

When display is to be effected in the device of FIG. 8, the planar photosensitive member 23 is moved in the direction of dotted-line arrow. In response to a selecting switch, the change-over switch 29 is changed over from the printing or the display as indicated by dotted line, and DC bias is applied to the toner carrying member 28b of the developing device 28 while the toner carrying member 27b of the other developing device 27 is grounded, whereby fog can be eliminated in the same manner as previously described and thus, an image of good quality can be obtained for both display and printing.

Of course, the fog preventing developing devices as described above are also applicable to the apparatus of FIG. 7.

As described above, by applying a process which does not require a predetermined order of steps in forming a toner image, forward and backward movements of the photosensitive member have been made possible by a simple construction. Moreover, a toner image in the form of a mirror image for printing and a toner image in the form of a positive image for display could be formed simply by changing the direction of movement of the photosensitive member without changing the signal, the scanner, etc. used for recording and display.

Also, such toner image forming means may be disposed anywhere between the transfer position and the display position to render the movement distance of the photosensitive member minimum even if any one of transfer and display is selected.

[An Experimental Example]

As the photosensitive layer of the photosensitive member, a mixture of cadmium sulfide (CdS) powder activated by copper (Cu) and acrylic resin at a weight ratio of 100:7 was dispersed in toluene. This material was thinly applied to the treated side of a resin film having one side thereof treated for conduction, whereafter this photosensitive layer was dried at 70° C. for about 30 minutes, whereby there was obtained a photosensitive layer having a thickness of 60 $\mu$m. The photosensitive member thus obtained was made into an endless form and passed over a pair of rotary shafts. A developing device using conductive magnetic toner was disposed at the developing position outside this photosensitive member. This magnetic toner was supplied to the photosensitive member by carrying it on a non-magnetic sleeve of stainless steel due to the magnetic field of the magnet therein. On the other hand, an optical system for projecting a modulated laser light onto said developing position was disposed inside the photosensitive member.

In the above-described construction, when the photosensitive member was exposed to a quantity of light of about 2.8 $\mu$J/cm$^2$ while it was being moved at a speed of 12 cm/sec. and a voltage of 250 V was being applied to the sleeve of the developing device, a sharp positive image was obtained on the surface of the photosensitive member. This positive image was utilized for display. On the other hand, the photosensitive member was then moved at the same speed but in the opposite direction while the same exposure was being applied to the photosensitive member. As a result, a toner image in the form of a mirror image was formed on the photosensitive member. A transfer material of relatively high surface resistance was superposed on this toner image and a conductive roller having $-500$ V applied thereto was caused to act on the back side of the paper, whereupon a toner image in the form of a sharp positive image could be transferred to the transfer material.

It has been found that the toner remaining on the photosensitive member again passes through the developing device and is introduced into the toner in this developing device and thus, there is no necessary of providing a cleaning device.

In the foregoing description, a beam scanning device using a laser light has been shown as exposure means. However, as the exposure means disposed on the opposite side to the developing device for the photosensitive member, a modulated light by an LED element array, a liquid crystal shutter array, a light emitting element array or a shutter array can replace the abovementioned laser scanning system.

Figure 12:
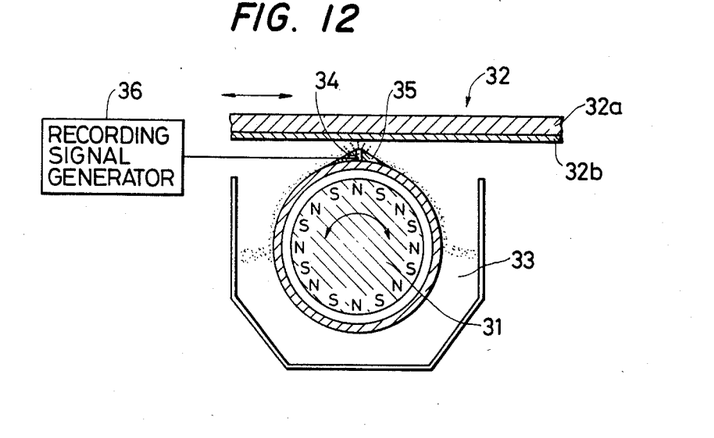
FIG. 12 is a cross-sectional view of recording means showing an example of the toner image forming means applicable to the present invention.

Further, as the toner image forming means effective for the present invention, use may be made of recording means for supplying toner onto an electrode and applying a signal voltage to this electrode, thereby causing the toner to adhere to the image bearing member in the form of an image, as shown in FIG. 12. This means is also disclosed in U.S. Pat. No. 3,914,771 and therefore, the construction and operation thereof will be only simply described herein.

FIG. 12 is a cross-sectional view of the recording means. Designated by 31 is a rotatable magnet roll, the direction of rotation of which is determined by the direction of movement of an image bearing member 32. A non-magnetic stationary sleeve is provided around this roll 31, and conductive magnetic toner 33 moves on the sleeve in the direction opposite to the direction of rotation of the roll 31. Between the sleeve and the image bearing member, signal electrodes 34 are embedded in an insulative seal member 35 at a density of 8 electrodes per millimeter in the direction of the width of the image bearing member 32. The image bearing member 32 comprises a conductive substrate 32a and a surface insulating layer 32b.

In the above-described construction, when a recording signal is applied from a recording signal generator 36 to the signal electrodes on which the toner passes, charges by the applied voltage are induced in the toner and charges of the opposite polarity are induced on the conductive substrate 32a on one image bearing member side. As a result, the toner on the electrodes to which the signal voltage has been applied is attracted by the charges of the opposite polarity through the insulating layer 32b and moves toward the image bearing member while overcoming the magnetic field. The above-described recording apparatus causes the toner to move in the same direction as the image bearing member and therefore, as soon as the direction of movement of the image bearing member is reversed by the output of the display or printing selecting switch, the direction of rotation of the magnet roll 31 may also be reversed.

The recording means as described above can also be applied to carry out the present invention.

Figure 13:
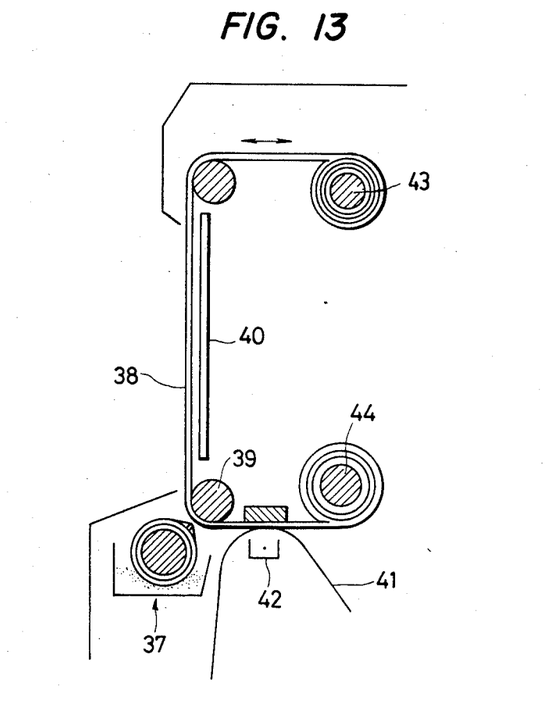
FIG. 13 is a cross-sectional view of the main part of the arrangement using transparent film for the image bearing member.

In the image forming apparatus using the recording means of FIG. 12, the insulating layer 32b of the image bearing member 32 may be formed of transparent resin film and the conductive substrate 32 may be a fixed electrode. FIG. 13 is a cross-sectional view showing the essential portions of the apparatus construction when the image bearing member is formed of transparent film. In FIG. 13, reference numeral 37 designates the recording means of FIG. 12, reference numeral 38 denotes an image bearing member in the form of transparent film, reference numeral 39 designates a fixed electrode opposed to the recording means 37, and reference numeral 40 denotes a milk-white reflecting plate which constitutes a display portion. On the other hand, a transfer portion lies on the opposite side to the display portion of this recording means, and a transfer discharger 42 or a transfer electrode roller for transferring the toner image to a transfer material 41 is disposed in the transfer portion. In the above-described apparatus, only the image bearing member 38 of transparent film is reciprocally moved in the direction of arrow by the rotation of drive rollers 43 and 44.

Using transparent film as the image bearing member as described above leads to the possibility that the toner image on this film is projected and can be visually recognized by a plurality of persons if a light source is disposed on the reflecting plate 40 side and a lens is provided on that side of the film which is visually recognized.

What we claim is:

1. An image forming apparatus having displaying and printing functions and comprising:

an image bearing member movable in opposing first and second directions;

recording means for forming an erasable visible image on a surface of said image bearing member in a direction substantially perpendicular to the first and second directions of movement of said image bearing member;

drive means for moving said image bearing member when an image is formed thereon by said recording means, said drive means being operative in a display mode to move said image bearing member in said first direction and being operative in a print mode to move said image bearing member in said second direction;

display means for visually displaying the visible image in the form of a positive image on said image bearing member and formed by said drive means moving said image bearing member in said first direction; and transfer means for conveying a transfer material to the surface of said image bearing member on which a mirror image has been formed by said drive means moving said image bearing member in said second direction and for transferring to the transfer material the visible mirror image from said image bearing member.

2. An image forming apparatus according to claim 1, wherein said image bearing member comprises a belt, and said image bearing member is rotatively driven by said drive means in said first direction and said second direction.

3. An image forming apparatus according to claim 1, wherein said image bearing member comprises a planar plate and is movable by said drive means in a plane in said first direction and said second direction.

4. An image forming apparatus according to claim 2, wherein said recording means is disposed between said display means and said transfer means.

5. An image forming apparatus having displaying and printing functions and comprising:

a movable image bearing member including a transparent back-up member and a photoconductive layer and being movable in opposing first and second directions;

recording means including exposure means disposed on the side of said transparent back-up member of said image bearing member for exposing said image bearing member to light information in a direction substantially perpendicular to said first and second directions of movement of said image bearing member, and supply means for supplying toner to the surface of said image bearing member at the side of said photoconductive layer of said image bearing member and at the location where said image bearing member is exposed by said exposure means to form a toner image;

drive means for moving said image bearing member when an image is formed thereon by said recording means, said drive means being operative in a display mode to move said image bearing member in said first direction and being operative in a print mode to move said image bearing member in said second direction;

display means provided on the side of said image bearing member supplied with toner by said supply means for visually displaying the toner image in the form of a positive image on said image bearing member and formed by said drive means moving said image bearing member in said first direction; and transfer means provided on the side of said image bearing member supplied with toner for conveying a transfer material to the surface of said image bearing member to which toner is supplied by said supply means to form a mirror toner image when said drive means moves said image bearing member in said second direction, and for transferring to said transfer material the mirror toner image from said image bearing member.

6. An image forming apparatus according to claim 5, wherein said exposure means of said recording means comprises means for scanning a modulated light beam.

7. An image forming apparatus according to claim 5, wherein said exposure means comprises an array-like element for causing light to flicker in accordance with a recording signal.

8. An image forming apparatus having displaying and printing functions and comprising:

a movable image bearing member including an insulating layer having a charge-retaining capability and being movable in opposing first and second directions;

recording means disposed on the surface of said image bearing member on the side of said insulating layer and comprising a plurality of electrodes for selectively applying toner to said insulating layer, in accordance with a signal voltage applied to said plurality of electrodes, to form a toner image;

drive means for moving said image bearing member when an image is formed thereon by said recording means, said drive means being operative in a display mode to move said image bearing member in said first direction and being operative in a print mode to move said image bearing member in said second direction;

display means provided on the side of said image bearing member to which toner is applied by said recording means for displaying the toner image in the form of a positive image on said image bearing member and formed by said drive means moving said image bearing member in said first direction; and transfer means provided on the side of said image bearing member to which toner is applied for conveying a transfer material to the surface of said image bearing member to which toner is applied by said electrodes to form a mirror toner image when said drive means moves said image bearing member in said second direction, and for transferring to said transfer material the mirror toner image from said image bearing member.

9. An image forming apparatus according to claim 8, wherein said recording means disposes conductive toner between a plurality of electrodes and said insulating layer of said image bearing member and causes the toner on the electrodes to which a voltage has been applied to adhere to the insulating layer side of said image bearing member.

10. An image forming apparatus according to claim 3, wherein said recording means is disposed between said display means and said transfer means.

* * * * *